(12) United States Patent
Wu et al.

(10) Patent No.: US 7,903,611 B2
(45) Date of Patent: Mar. 8, 2011

(54) HANDOFF METHOD IN A WIRELESS LOCAL AREA NETWORK AND APPARATUS USING THE SAME

(75) Inventors: I-Wei Wu, Yunlin County (TW); Chun-Yun Hsieh, Hsinchu County (TW); Jun-Lin Liu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 938 days.

(21) Appl. No.: 11/761,377

(22) Filed: Jun. 12, 2007

(65) Prior Publication Data
US 2008/0117879 A1 May 22, 2008

(30) Foreign Application Priority Data
Nov. 16, 2006 (TW) .................... 95142391 A

(51) Int. Cl.
 H04W 4/00 (2009.01)
 H04W 36/00 (2009.01)
(52) U.S. Cl. ......... 370/331; 370/310; 370/328; 370/338; 455/436; 455/442
(58) Field of Classification Search .................. 370/331, 370/310, 328, 338
See application file for complete search history.

(56) References Cited

U.S. PATENT DOCUMENTS

| 6,278,877 | B1 | 8/2001 | Brederveld et al. | |
| 6,980,535 | B2 | 12/2005 | Bennett | |
| 7,289,472 | B2 * | 10/2007 | Yano et al. | 370/331 |
| 7,430,431 | B2 * | 9/2008 | Harris et al. | 455/522 |
| 7,577,434 | B2 * | 8/2009 | Nakano et al. | 455/436 |
| 2002/0163908 | A1 * | 11/2002 | Lakaniemi et al. | 370/350 |
| 2004/0224690 | A1 | 11/2004 | Choi et al. | |
| 2005/0282546 | A1 | 12/2005 | Chang et al. | |
| 2006/0062183 | A1 | 3/2006 | Forte et al. | |
| 2006/0072507 | A1 | 4/2006 | Chandra et al. | |
| 2006/0092883 | A1 | 5/2006 | Lee et al. | |
| 2006/0268756 | A1 * | 11/2006 | Wang et al. | 370/310 |
| 2006/0268802 | A1 * | 11/2006 | Faccin | 370/338 |
| 2008/0037469 | A1 * | 2/2008 | Hamilton et al. | 370/331 |

FOREIGN PATENT DOCUMENTS

| TW | 1234978 | 6/2005 |
| TW | 1264956 | 10/2006 |
| WO | WO2004/054283 A2 | 6/2004 |

OTHER PUBLICATIONS

"Office Action of Taiwan counterpart application", issued on Dec. 24, 2009, p. 1-p. 6.

* cited by examiner

Primary Examiner — Huy Phan
(74) Attorney, Agent, or Firm — Jianq Chyun IP Office

(57) ABSTRACT

A handoff method in a wireless local area network (WLAN) and an apparatus using the same are provided. A mobile station (MS) switches between a data transceiving mode and a probing mode at a predefined interval when the MS is transmitting/receiving packages. In the probing mode, the MS probes one or more channels each time and selects an access point (AP) for handoff from the probing result according to a predetermined rule, so as to re-establish a network connection.

18 Claims, 7 Drawing Sheets

HANDOFF METHOD IN A WIRELESS LOCAL AREA NETWORK AND APPARATUS USING THE SAME

CROSS-REFERENCE TO RELATED APPLICATION

This application claims the priority benefit of Taiwan application serial no. 95142391, filed on Nov. 16, 2006. All disclosure of the Taiwan application is incorporated herein by reference.

BACKGROUND OF THE INVENTION

1. Field of the Invention

The present invention generally relates to a handoff method and an apparatus using the same and, more particularly relates to a wireless local area network (WLAN) and an apparatus using the same.

2. Background of the Invention

Along with the widespread of wireless local area network (WLAN), voice over WLAN (VoWLAN) is becoming the focus of development. However, current IEEE802.11 standard cannot meet the requirement of VoWLAN due to over-long handoff latencies in WLAN according to existing research data.

WLAN has more handoff opportunities compared to other wireless systems. This is because the coverage of each access point (AP) in a WLAN is not very large (50 m~100 m), and accordingly the number of handoffs to every VoWLAN user is increased. According to related research, the handoff latency time at the media access control (MAC) layer of a WLAN is between 200 ms and 1000 ms. A mobile station (MS) switch among various working channels to find an appropriate AP when a handoff is started. During this probing period, the MS terminate its connection to the current AP, so that the MS cannot transmit/receive any package. Such continuous package loss in VoWLAN causes conversation pause or termination and accordingly reduces the communication as well as voice quality of VoWLAN.

In conventional handoff mechanism, the handoff latency at the MAC layer of a WLAN is composed of probe delay, authentication delay, and association delay. FIG. 1 illustrates the composition of the handoff latency in a WLAN. Probe delay refers to the delay produced while a MS searches for an appropriate AP in all available channels. The authentication delay refers to the delay produced while the MS performs authentication with the new AP. Association delay refers to the delay produced while the MS re-establishes a network connection with the new AP.

FIG. 2 illustrates the probing process during a handoff procedure at the MAC layer of a WLAN. Channel switch & transmission (CST) refers to the time required by a MS for switching from one to another channel. Min channel time and max channel time respectively refer to the minimum and maximum time required by a MS for probing a channel.

If a MS receives a probe response from an AP on the channel A after the MS sends a probe request to this channel A, the MS wait for the max channel time to obtain all possible probe responses from the channel A. This is because the MS does not know how many APs the channel A has. On the other hand, if the MS does not receive any probe response from the channel A after the MS sends a probe request, the MS waits for the min channel time to probe next channel.

FIG. 3 illustrates a conventional handoff method in a WLAN. When the current signal quality of MS is lower than a predefined threshold value, the MS turns on the handoff mechanism. Here the MS sequentially probes all channels, such as channels 1~N in FIG. 3. Thereafter, the MS determines which channel has the qualified AP according to a predetermined rule, and the MS switches channels to and re-establishes a network connection with the qualified AP.

According to the method described above, all the channels are probed in sequence before the MS switches channels and re-establishes a network connection. Since the MS cannot communicate with the current AP while probing all the channels, those packages transmitted during the handoff are lost. Accordingly, the conversation may be paused temporarily while the MS probes all channels, which could be very dissatisfying to users of VoWLAN.

In addition, various handoff methods have been further provided. For example, the U.S. Pat. No. 6,278,877 disclosed a patent of "Handover Method for Mobile Wireless Station". According to this method, a MS passively collects the beacon information issued by APs and determines whether to search for neighboring APs according to the intensities of the beacon signals. The MS determines to handoff to which AP according to the intensities of the beacon signals issued by those neighboring APs. A passive signal detection mechanism is adopted in this patent, namely, the MS statically collects beacon signals issued by neighboring APs.

The U.S. Pat. No. 6,980,535 disclosed a patent of "Handover Method for Mobile Wireless Station". According to this method, the AP currently connected to the MS issues probe requests to neighboring APs, and the MS statically collects the probe responses sent back by those neighboring APs.

The PCT. WO Patent No. 2004054283 disclosed a patent of "System and Method for Performing a Fast Handoff in a Wireless Local Area Network". According to this patent, channels are sorted before they are probed so as to reduce the probing time of the MS. The handoff method in this patent is similar to the operation of a neighbor graph, wherein a nearest-neighbor table is stored in each MS and the APs in each nearest-neighbor table are sorted according to historic experiences, and after that, the APs are probed according to their sorted sequence.

Moreover, the U.S. Patent No. 20060092883 disclosed a patent of "Probing method for fast handoff in WLAN", the U.S. Patent No. 20050282546 disclosed a patent of "Method and system for providing fast handoff in a WLAN-like communication system using active neighboring sets", the U.S. Patent No. 20060062183 disclosed a patent of "Methods and systems for reducing MAC layer handoff latency in wireless networks", the U.S. Patent No. 20040224690 disclosed a patent of "Handoff method in wireless LAN, and access point and mobile station performing handoff method", and the U.S. Patent No. US20060072507 disclosed a patent of "Minimizing handoffs and handoff times in wireless local area networks" etc. These patents are to reduce the time required for probing channels by a MS.

SUMMARY OF THE INVENTION

One example consistent with the invention provides a handoff method in a WLAN communication system. The WLAN communication system includes a MS and a plurality of access points (APs). According to the handoff method, when a MS is transmitting/receiving packages, the MS switches between a data transceiving mode and a probing mode at a predefined interval. In the probing mode, the MS selects a channel to probe APs on that channel, obtains the signal quality values of the APs, and selects an AP for handoff according to a predetermined rule, so as to re-establish the network connection.

Another example consistent with the invention provides a handoff method in a WLAN. The WLAN communication system includes a MS and a plurality of APs. According to the handoff method, the MS selects one or more channels each time for probing the APs discontinuously and records the intensities of received signals of the APs. If the signal quality value of the AP currently connected to the MS is lower than a minimum acceptable signal quality value while a handoff is performed, the MS selects a temporary AP and temporarily switches from the current AP to the temporary AP to continue with the discontinuous probing. After all the channels have been probed, the MS selects an AP for handoff according to a predetermined rule. In another example, the invention provides an apparatus using a WLAN handoff method, the WLAN communication system comprising a plurality of APs, the apparatus comprising a transceiving module, for transmitting/receiving packages, and a probing module, for probing the APs, wherein the transceiving module and the probing module switch at a predefined interval while the apparatus performs a handoff function, wherein the probing module probes one or more channels each time and selects one of the APs for handoff and re-establishing a network connection according to a predetermined rule.

It is to be understood that both the foregoing general description and the following detailed description are exemplary and explanatory only and are not restrictive of the invention, as claimed.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DETAILED DESCRIPTION OF THE INVENTION

In a conventional handoff technique, a mobile station (MS) probes all channels at one time and selects the optimal access point (AP) for handoff after all the channels have been probed. Thus, great package loss is caused during the probing procedure, i.e. MS is not able to receive any voice during the probing procedure, so that the temporary termination of the conversation is caused, which is very dissatisfying to users of voice over wireless local area network (VoWLAN).

The invention provides a wireless local area network (WLAN) seamless handoff mechanism, which includes discontinuous probe mechanism, stop-then-resume mechanism, and early connecting mechanism, and a method thereof. According to an exemplary embodiment of the invention, a WLAN seamless handoff mechanism and a method thereof are provided, wherein the authentication information of a MS is inserted into a probe request which is to be sent by the MS so as to reduce the time required for authentication. The WLAN seamless handoff mechanism and method in the invention may reduce the handoff delay, which includes probe delay, authentication delay, and association delay, at the media access control (MAC) layer of a WLAN, so as to reduce the handoff time effectively.

The MS probes one or more channels each time at a predefined interval according to the aforementioned discontinuous probe mechanism of the invention. According to the stop-then-resume mechanism, if the MS finds an AP which is more suitable than the current AP during the discontinuous probing and the received signal strength indicator (RSSI) of the MS is almost lower than the minimum standard for transmitting/receiving packages, the MS handoffs to the more suitable AP and starts to probe those un-probed channels discontinuously. This AP is referred to as a temporary AP since the MS only handoffs to this AP temporarily. Thereafter if a more suitable AP is found, the MS again handoffs to this more suitable AP. According to the early connecting mechanism, once a very suitable AP is found by the MS during a discontinuous probe procedure, the MS instantly handoffs to this AP and stops the probing operation.

Exemplary embodiments of the invention will be described below.

Figure 1:
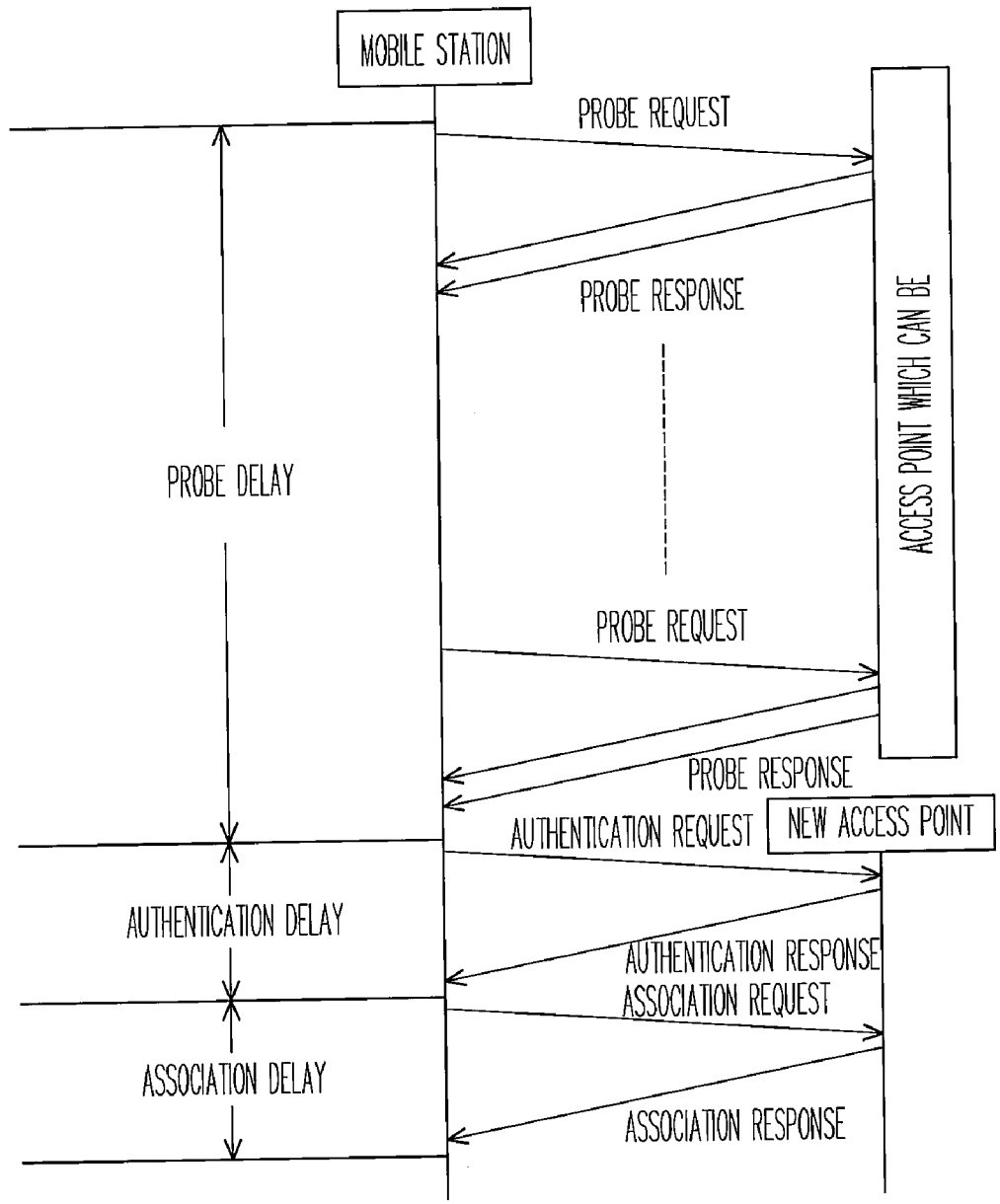
FIG. 1 illustrates the composition of a handoff latency in a wireless local area network (WLAN).
Figure 2:
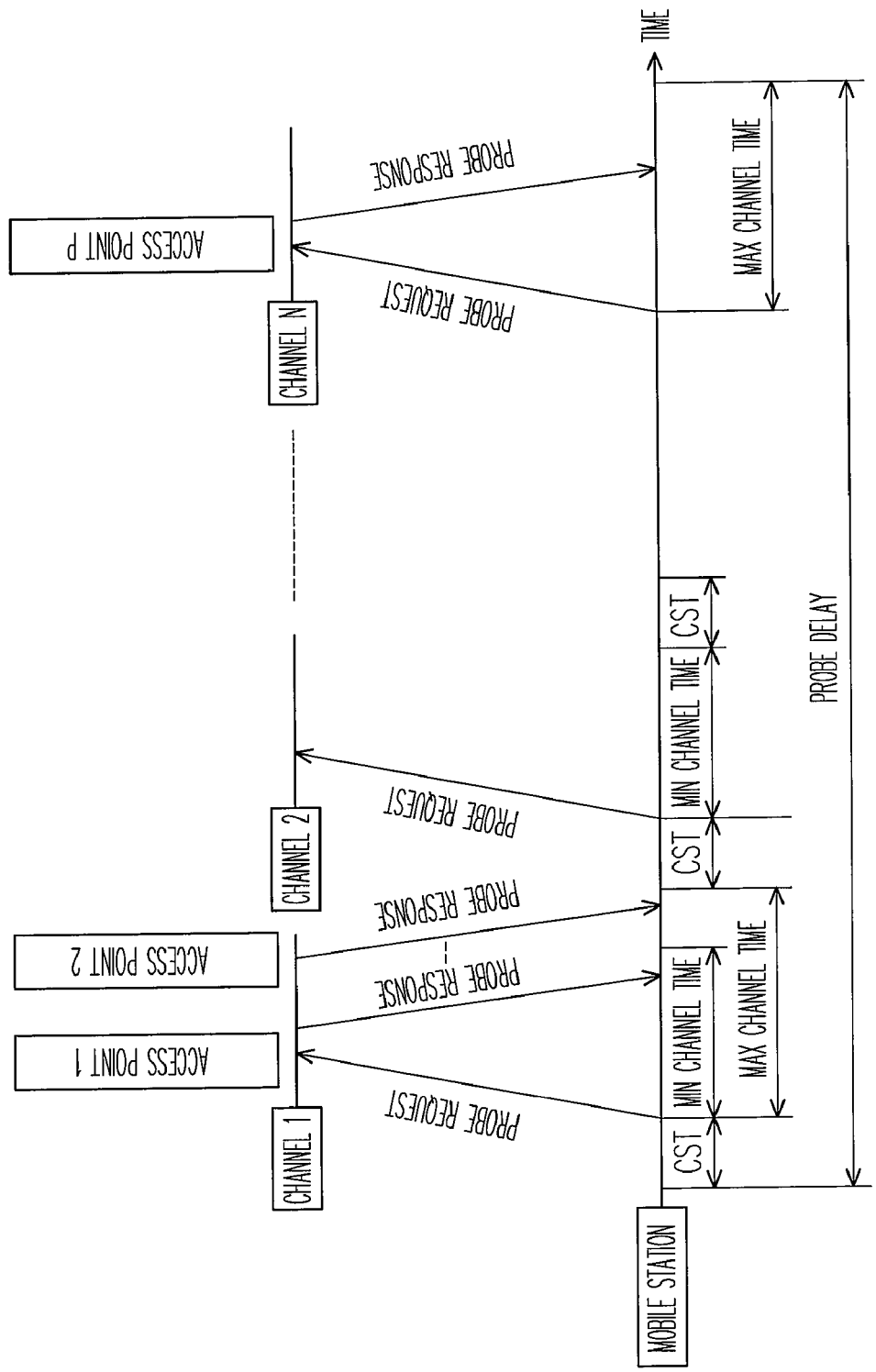
FIG. 2 illustrates the probing process during a handoff procedure at the MAC layer of a WLAN.
Figure 3:
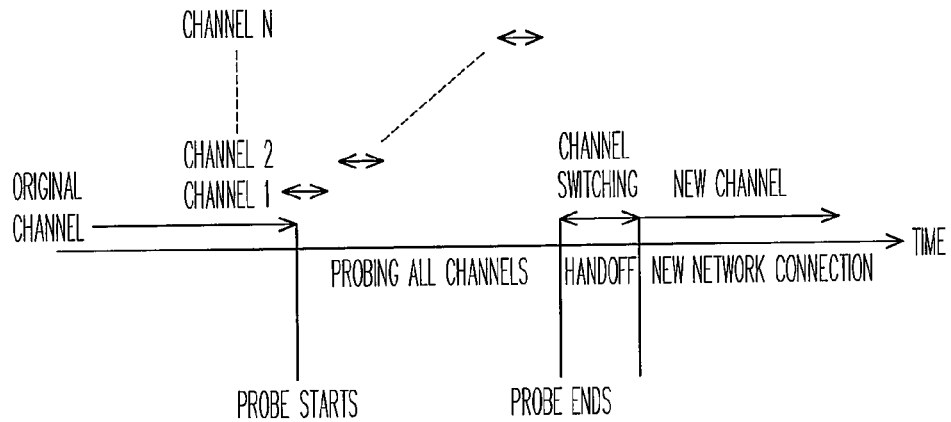
FIG. 3 illustrates a conventional handoff method in a WLAN.
Figure 4:
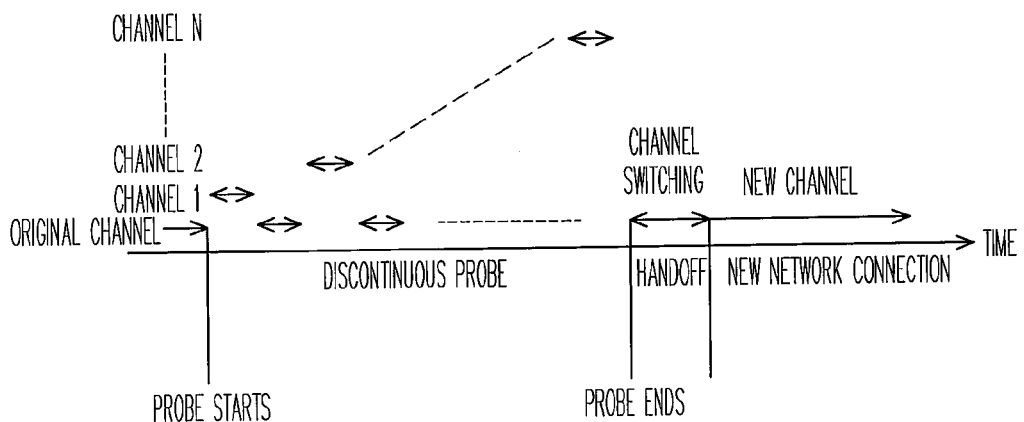
FIG. 4 illustrates a handoff method according to an exemplary embodiment of the present invention.

FIG. 4 illustrates a handoff method according to an exemplary embodiment of the invention. In the embodiment, preferably, the discontinuous probe is started when the number of the signal quality values of the MS being continuously lower than a predetermined signal quality threshold value reaches a threshold number, in which the signal quality threshold value is referred to as discontinuous probe threshold. During the discontinuous probe, the MS switches between a data transceiving mode and a probing mode at a predefined interval. The MS transmits/receives packages while the MS is in the data transceiving mode. The MS probes one or more channels discontinuously and selects an AP from the probing result for handoff according to a predetermined rule (for example, the predefined signal quality or the predefined service quality) while the MS is in the probing mode.

As shown in FIG. 4, the MS switches from an original channel to channel 1 for probing APs (the MS enters the probing mode), and switches back to the original channel for transmitting/receiving packages (the MS enters the data transceiving mode). After that, the MS switches from the original channel to channel 2 for probing APs (the MS enters the probing mode again), and the MS switches back to the original channel for transmitting/receiving packages (the MS enters the data transceiving mode again). In the embodiment, the original probe procedure is divided into several time units when the MS is transmitting/receiving packages so that package loss is reduced and the mean opinion score (MOS) of the voice communication is increased.

As shown in FIG. 4, the MS switches between package transmission/reception and discontinuous probe in such sequence as the original channel, channel 1, the original channel, channel 2, until the predetermined number of channel. While in another exemplary embodiment of the invention, the MS may also transmit/receive packages on the original channel, probe channel 1, channel 2, and channel 3 continuously, and switch back to the original channel for transmitting/receiving packages. While in yet another exemplary embodiment of the invention, the MS may also transmit/receive packages on the original channel, probe those odd channels such as channel 1, channel 3, and channel 5 or even channels such as channel 2, channel 4, and channel 6 continuously, and switch back to the original channel for transmitting/receiving packages. In other words, the sequence in which the channels are probed can be adjusted according to the requirement of design.

Figure 5:
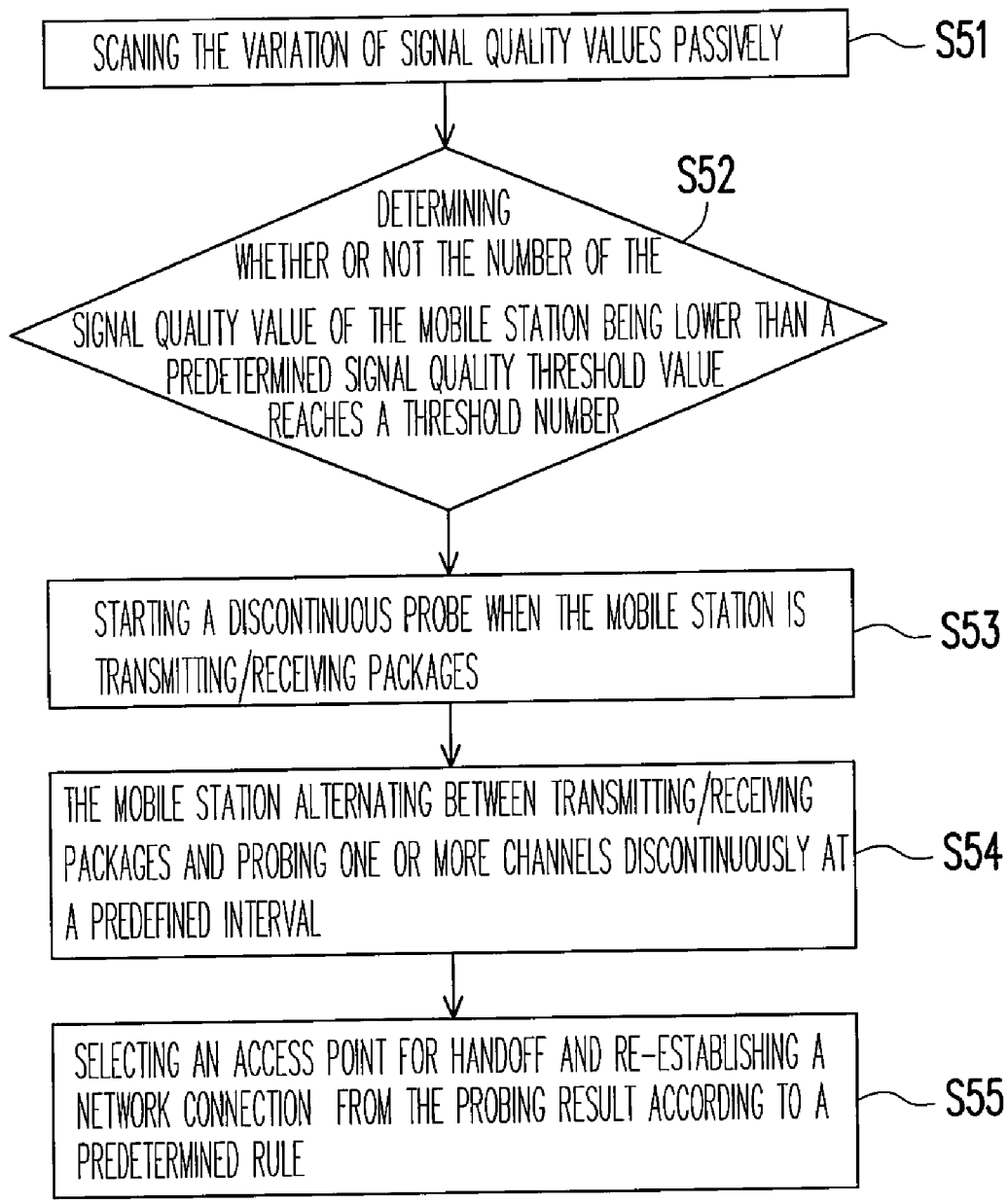
FIG. 5 is a flowchart of a handoff method according to an exemplary embodiment of the present invention.

FIG. 5 is a flowchart of a handoff method according to an exemplary embodiment of the invention. Referring to FIG. 4 and FIG. 5, the MS executes step S51 first after it is started up, wherein the MS passively scans the variations of the signal quality value continuously. In step S52, the MS determines whether or not the number of the signal quality value of the MS being constantly lower than a predetermined signal quality threshold value, namely, the aforementioned discontinuous probe threshold, reaches a predetermined threshold number, if so, the MS executes step S53 to start the discontinuous probe in step S54 if the MS is transmitting/receiving packages.

During the discontinuous probe in step S54, the MS switches between package transmission/reception and discontinuously probing one or more channels sequentially at a predefined interval. In step S55, the MS selects an AP from the probing result for handoff and re-establishing a network connection according to a predetermined rule (for example, the predefined signal quality or the predefined service quality).

Figure 6:
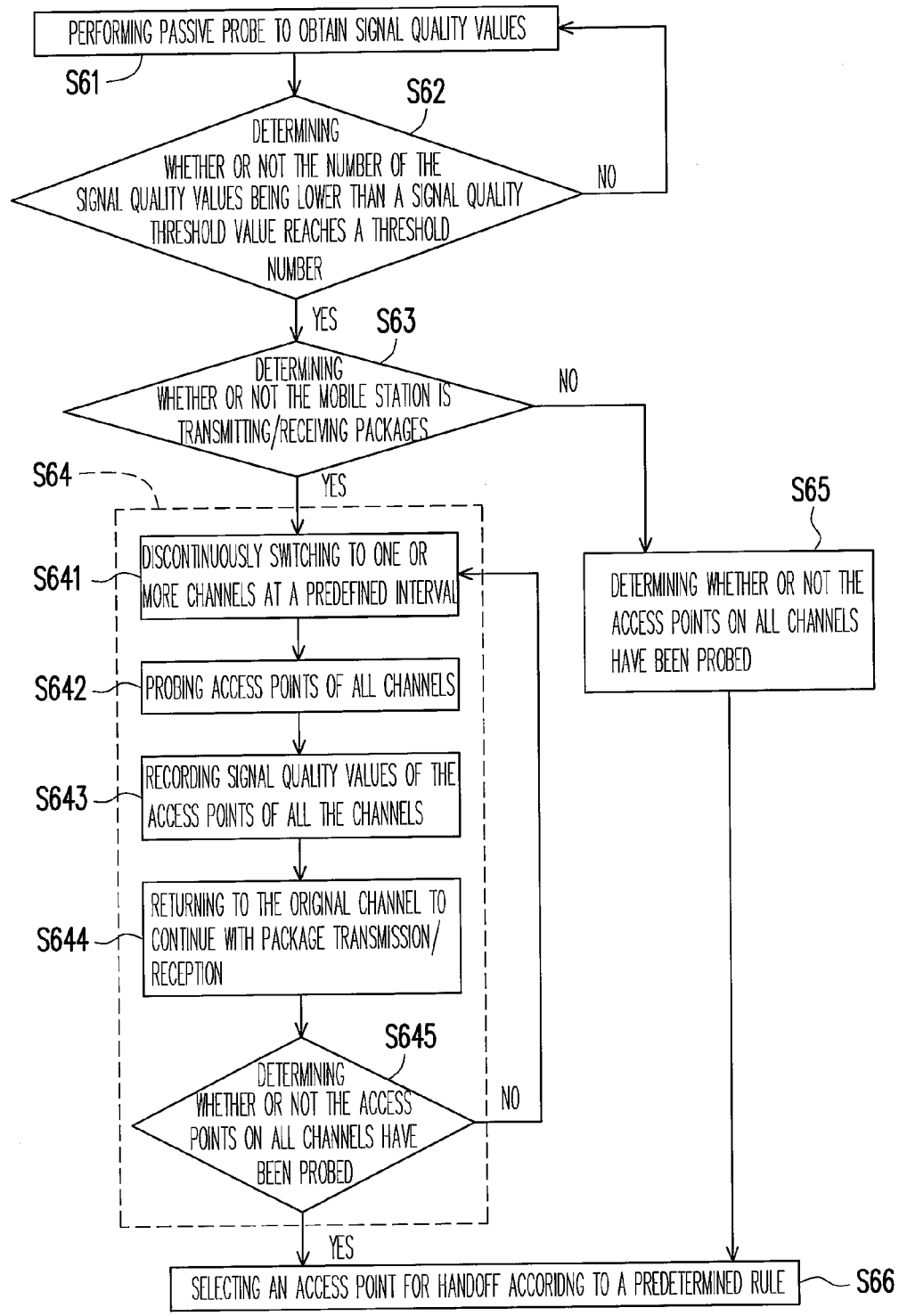
FIG. 6 is a flowchart of a handoff method according to an exemplary embodiment of the present invention.

FIG. 6 is a flowchart of a handoff method according to an exemplary embodiment of the invention. Referring to FIG. 6, in step S61, a MS performs passive scan to obtain a signal quality value. In step S62, the MS determines whether or not the number of the signal quality value obtained in step S61 being lower than the signal quality threshold value reaches a threshold number, if so, the MS executes step S63, otherwise the MS returns to step S61 to constantly scan the variation of the signal quality values. When the number of the signal quality value being lower than the signal quality threshold value reaches the threshold number, the MS determines whether or not it is transmitting/receiving packages as in step S63, if so, the MS performs discontinuous probe in step S64, otherwise, the MS probes all channels continuously and records the signal quality values of the APs on these channels.

Step S64 may be further divided into several sub-steps as step S641 to step S644 in FIG. 6. In step S641, the MS discontinuously switches to one or more channels at a predefined interval; in step S642, the MS probes APs on those channels mentioned in step S641; in step S643, the MS records signal quality values of the APs probed in step S642; in step S644, the MS returns to the original channel for transmitting/receiving packages again; in step S645, the MS determines whether or not APs on all channels have been probed, if so, the MS executes the next step S66, otherwise the procedure returns to step S641.

In step S66, the MS selects an AP for handoff among the APs on all the channels the MS has probed according to a predetermined rule.

Parameter Settings of Discontinuous Probe

In the embodiment described above, the predetermined signal quality threshold value, the threshold number, the predetermined rule such as the predefined signal quality or the predefined service quality, the predefined interval, and the channel number to be probed during the discontinuous probe are all determined according to factors of the communication system, the communication protocol, or the communication environment etc., and all the foregoing variations are within the scope of the invention. Here the signal quality value may be the received signal strength indicator (RSSI) in a WLAN.

Please refer to following description of an exemplary embodiment of the invention for the settings of various parameters in the discontinuous probe of the invention, but which is not intended for limiting the parameter settings in the invention. According to an exemplary embodiment of the invention, the discontinuous probe threshold (DPT) is used as the point for starting the discontinuous probe. DPT varies with the design of each WLAN chipset and the current moving speed of the MS; however, DPT may chosen to be higher than the minimum acceptable signal quality value (RSSI), i.e. the minimum signal quality value for transmitting/receiving packages, which is denoted as $RSSI_{min}$. The moving speed of MS (referred to as MS_Speed thereinafter) can be calculated based on the variation of RSSI per time unit as shown in following formula:

$$MS\_Speed = \frac{DS(RSSI_t) - DS(RSSI_{t-M\_interval})}{M\_interval}$$

Function DS( ) denotes the conversion between RSSI and the distance between the MS as well as the AP, the input of function DS( ) is RSSI, while the output thereof is the distance between the MS and the AP. Function DS( ) varies with the design of each WLAN chipset. $RSSI_t$ and $RSSI_{t-M\_interval}$ respectively denote the value of RSSI at time t and t-M_interval, and M_interval denotes the interval of sampling RSSI.

DPT can be deducted as following based on MS_Speed and $RSSI_{min}$:

$$DPT = RSSI_{min} + DS^{-1}(MS\_Speed \times (Disprobe\_Time + M\_interval \times \alpha))$$

Function $DS^{-1}( )$ also denotes the conversion between RSSI and the distance between the MS as well as the AP, $DS^{-1}( )$ is the inverse function of DS( ). Namely, the input of function $DS^{-1}( )$ is the distance between the MS and the AP, while the output thereof is RSSI. $\alpha$ denotes that the MS only starts the discontinuous probe when the RSSI value of the MS has been constantly lower than DPT for $\alpha$ time units (M_interval). Disprobe_Time denotes the time required for probing all the channels discontinuously. The value of Disprobe_Time is represented with following formula:

$$Disprobe\_Time = (MaxChannel\ Time + RTT + 2 \times CST) \times TotalChannel + MinWaitTime \times (TotalChannel - 1)$$

MaxchannelTime denotes the maximum time required by the MS for probing a channel. RTT (Round Trip Time) denotes the round trip time of a probing package. CST denotes channel switch & transmission time, namely, the time required by the MS for switching from one channel to another. TotalChannel denotes the total number of channels which MS should probe when a handoff happens. MinWaitTime denotes the minimum time required by the MS for returning to an original channel after the MS has finished probing a channel.

As shown in FIG. 6, once the MS decides to start a discontinuous probe, the MS arrange which channels be probed, how much time MS should stay in the original channel during discontinuous probe (this time interval is denoted as probing interval), and how many channels be probed at one time. The channels may be probed in a sequence based on the probabilities of the channels been used. For example, when the MS deploys IEEE 802.11b standard, channels 1, 6, and 11 are probed first. This is because these three channels are used most often, thus, more information may be obtained by probing the three channels. The other channels are sequentially probed from the smallest to the largest, or are probed using other sequence. The probing interval is varied by what kind of chipset is deployed in MS, and can be decided based on a simulation result. Too short probing interval may cause package loss, while too long probing interval may lead the discontinuous probe taking longer time. According to existing simulation result, there is almost no package loss while the probing interval is equal or larger to 250 ms. The number of channels which should be probed each time is also decided by which chipset is used in MS, and can be determined based on a simulation result. The number of channels to be probed each time is determined by the maximum time for the WLAN system to tolerate the MS temporarily not receiving packages without any package loss. According to existing simulation result, a very good result can be obtained when 1 channel is probed each time.

Stop-Then-Resume Operation Mechanism

Because the entire probing time would be prolonged if the discontinuous probe is performed, the MS may force to handoff before all channels are probed. To solve this problem, we propose the stop-then-resume mechanism. The stop-then-resume mechanism is described as follows: when the RSSI value of the MS is almost lower than the minimum acceptable value for transmitting/receiving packages and the MS has found an AP which has higher RSSI value than current AP, MS handoffs to this AP which has higher RSSI value (referred to as temporary AP), and the MS continues to use discontinuous probe for probing those channels which have not be probed. After that if a more suitable AP is found, the MS handoffs again to this AP. If the MS does not find any suitable AP before the RSSI value of the MS is already lower than the minimum acceptable value for transmitting/receiving packages, the MS adopts the conventional probe method (i.e. continuous probe) for probing unprobed channels.

Early Connecting Operation Mechanism

The early connecting mechanism is another one for reducing the effect caused by longer probing time. The early connecting mechanism is described as follows: once the MS finds an AP which its signal quality value is higher than or equal to a predetermined value during the discontinuous probe, the MS instantly handoffs to the AP and stops the probing operation. Here the predetermined value is referred to as B_threshold. B_threshold is determined according to the specification of the system that in principle is the signal quality which allows the MS to have the fastest transmission speed. The purpose of the early connecting mechanism is to reduce unnecessary probing.

Integral Operation Mechanism

Figure 7:
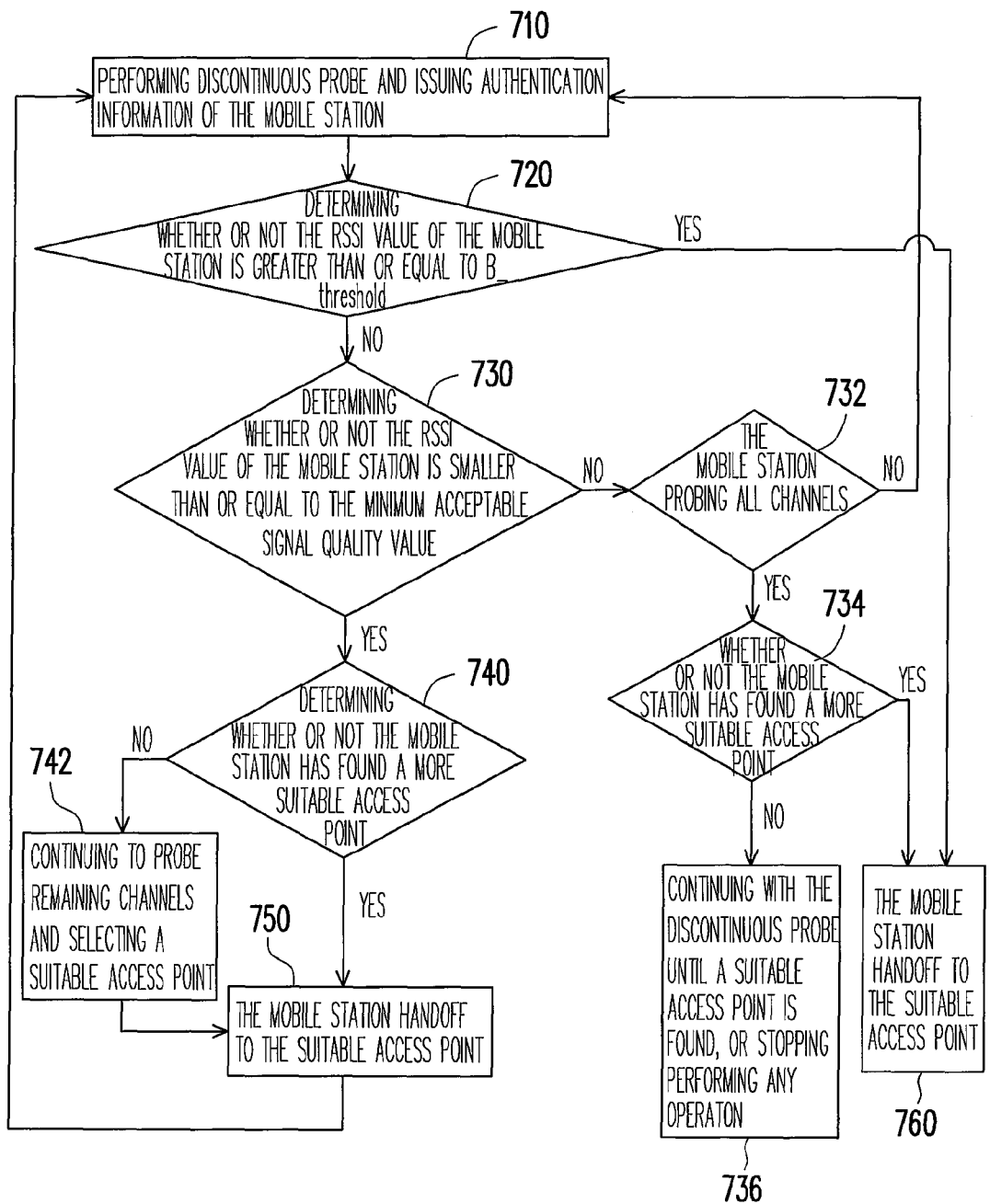
FIG. 7 is a flowchart illustrating the integral operation of a seamless handoff method in a WLAN according to an exemplary embodiment of the invention.

FIG. 7 is a flowchart illustrating the integral operation of a seamless handoff method in a WLAN according to an exemplary embodiment of the invention. In step 710, while a MS starts a discontinuous probe, the MS constantly detects the RSSIs of those APs currently online and records those APs which have been probed. Next, in step 720, whether or not the RSSI obtained by the MS is greater than or equal to B_threshold is determined. Once an AP having RSSI higher than or equal to B_threshold is found, the MS stops the probing operation instantly, as in step 760, which means the AP is a suitable AP. If no suitable AP is found, the MS executes the step 730 to determine whether or not the RSSI obtained by the MS is smaller than or equal to the minimum acceptable signal quality. If the RSSI obtained by the MS is greater than the minimum acceptable signal quality, the subsequent steps are executed, as in step 732, the MS continues with the discontinuous probe until all the channels have been probed. Next, in step 734, whether or not the MS has found a suitable AP is determined. If so, the MS handoffs to the AP in step 760, otherwise, the MS continues to probe unprobed channels in step 736, namely, the MS continues with the discontinuous probe until a suitable AP is found, or the MS terminates the network connection without doing anything process.

If the RSSI value is already lower than the minimum acceptable standard before the MS has probed all the channels, the MS selects an AP more suitable than current AP from those channels which have been probed in step 740. If the MS does not find a suitable AP, the MS continuously probes the rest channels which have not been probed until it finds a suitable AP. Here the reason for not using discontinuous probe is to reduce the time required by the MS for probing the channels. If an AP more suitable than the current AP is found, the MS handoffs to this AP first and continues with the discontinuous probe until the MS has probed all the channels in step 750. After all the channels have been probed, the MS selects an AP for handoff and re-establishing a network connection according to a predetermined rule.

Figure 8:
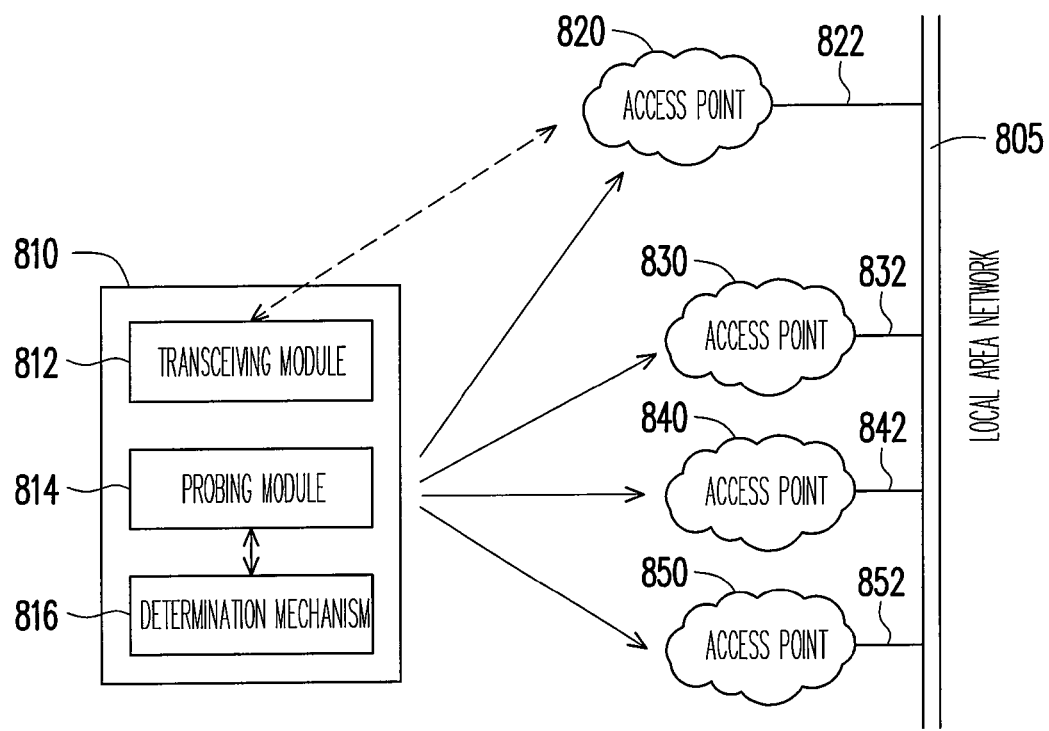
FIG. 8 illustrates an apparatus using the handoff method in a WLAN according to an exemplary embodiment of the invention.

FIG. 8 illustrates an apparatus using the handoff method in a WLAN according to an exemplary embodiment of the invention. Referring to FIG. 8, the WLAN communication system 800 includes a plurality of APs such as APs 820, 830, 840, and 850, and these APs are respectively connected to the local area network (LAN) 805 wirelessly or through connection cables such as 822, 832, 842, and 852. The apparatus 810 includes a transceiving module 812 and a probing module 814. The transceiving module 812 is used for transmitting/receiving packages, and the probing module is used for probing the APs 820, 830, 840, and 850. When the apparatus 810 performs a handoff function, the transceiving module 812 and the probing module 814 switch at a predefined interval. The probing module 814 probes one or more channels each time and selects an AP from the APs 820, 830, 840, and 850 for handoff and re-establishing a network connection according to a predetermined rule, such as the determination mechanism 816 as illustrated in FIG. 8. The probing module 814 selects one or more channels for discontinuously probing the APs 820, 830, 840, and 850, and the probing module 814 records the RSSIs of the APs. The transceiving module 812 continues to transmit/receive packages with current channel, for example, the channel established with the AP 820 for transmitting/receiving packages continuously.

The probing module 814 requests one of the APs 820, 830, 840, and 850 to respond by sending a probe request to that AP, and the probing module 814 determines the signal quality value of that AP according to the response signal sent by that AP. The authentication information of the MS is inserted into the probe request.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A handoff method in a wireless local area network (WLAN), the WLAN communication system comprising a mobile station (MS) and a plurality of access points (APs), the handoff method comprising:

the MS switching between a data transceiving mode and a probing mode at a predefined interval while the MS is transmitting/receiving packages, wherein in the probing mode, the MS probes one or more channels each time and selects an AP from the probing result for handoff and re-establishing a network connection according to a predetermined rule;

the MS further performs a stop-then-resume mechanism while the MS switches between the data transceiving mode and the probing mode, and according to the stop-then-resume mechanism, when the signal quality value between the current AP and the MS is lower than a minimum acceptable value, the MS selects a temporary AP and temporarily switches from the current AP to the temporary AP to continue probing;

when the temporary AP does not exist, the MS stops switching to the data transceiving mode and stays in the probing mode to continuously probe unprobed channels until an AP having a signal quality value greater than the signal quality value of the AP currently connected to the MS is found, and the MS selects the AP having a signal quality value greater than the signal quality value of the AP currently connected to the MS as the temporary AP for handoff.

2. The handoff method as claimed in claim 1, wherein the step of the MS switching between the data transceiving mode and the probing mode comprises:

in the probing mode, the MS discontinuously probing one or more channels each time, and recording intensities of received signals of the APs, and in the data transceiving mode, the MS continuing to transmit/receive packages in original channel;

switching between the data transceiving mode and the probing mode repeatedly until all the channels have been probed; and selecting an AP for handoff among the APs which have been probed according to the predetermined rule.

3. The handoff method as claimed in claim 1, wherein the signal quality value of the temporary AP is greater than the signal quality value of the AP which the MS currently connects.

4. The handoff method as claimed in claim 1, wherein the MS further performs an early connecting mechanism while the MS switches between the data transceiving mode and the probing mode, and according to the early connecting mechanism, in the probing mode, the MS directly handoff to an AP once the signal quality value of the AP is equal to or higher than a threshold value.

5. The handoff method as claimed in claim 1, wherein in the probing mode, the MS requests response from one of the APs by sending a probe request to the AP and determines the signal quality value of the AP according to a response signal sent by the AP.

6. The handoff method as claimed in claim 5, wherein an authentication information of the MS is embedded in the probe request.

7. The handoff method as claimed in claim 1, wherein the MS performs passive probing to obtain a signal quality value of a current AP before the MS enters the probing mode, and the MS switches between the data transceiving mode and the probing mode if the number of the signal quality value of the current AP being continuously lower than a signal quality threshold value reaches a threshold number.

8. The handoff method as claimed in claim 7, wherein the signal quality threshold value is obtained according to following formula:

$$DPT = RSSI_{min} + DS^{-1}(MS\_Speed \times (Disprobe\_Time + M\_Interval \times \alpha));$$

wherein function $DS^{-1}(\ )$ represents the convention between a received signal strength indicator (RSSI) and a distance between the MS as well as the AP, $DS^{-1}(\ )$ is the inverse function of $DS(\ )$ namely, the input of $DS^{-1}(\ )$ is the distance between the MS and the AP, $RSSI_{min}$ is a minimum signal quality value of the MS for transmitting/receiving packages, M_Interval denotes a interval of sampling signal quality values, MS_Speed denotes a moving speed of the MS, Disprobe_Time denotes a time required for the discontinuous probing, and $\alpha$ denotes a threshold number.

9. The handoff method as claimed in claim 8, wherein the value of Disprobe_Time is denoted with following formula:

$$Disprobe\_Time = (MaxChannel\ Time + RTT + 2 \times CST) \times TotalChannel + MinWaitTime \times (TotalChannel - 1)$$

wherein MaxchannelTime denotes a maximum time required by the MS for probing a channel, RTT (round trip time) denotes a round trip time of a probing package, CST denotes a channel switch and transmission time, namely, the time required by the MS for switching from one to another channel, TotalChannel denotes a total number of channels to be probed by the MS, MinWaitTime denotes a minimum time required by the MS for returning to an original channel after the MS has finished probing a channel.

10. The handoff method as claimed in claim 1, wherein the predetermined rule comprises a predefined signal quality.

11. The handoff method as claimed in claim 1, wherein the predetermined rule comprises a predefined service quality.

12. A handoff method in a WLAN, the WLAN communication system comprising a MS and a plurality of APs, the handoff method comprising:

the MS discontinuously probing several channels, that is, the MS only probing one or more channels and obtaining a signal quality values of the APs;

selecting a temporary AP, switching from the AP which the MS currently connects to the temporary AP, and continuing with the discontinuous probing if it is detected that the signal quality value of the AP currently connected to the MS is lower than a minimum acceptable signal quality value;

when the temporary AP does not exist, the MS continuing with the discontinuous probing to probe unprobed channels until an AP having a signal quality value greater than the signal quality value of the AP currently connected to the MS is found, and the MS selecting the AP having a signal quality value greater than the signal quality value of the AP currently connected to the MS as the temporary AP for handoff; and completing probing all channels of the MS and selecting an AP for handoff according to a predetermined rule.

13. The handoff method as claimed in claim 12, wherein in the discontinuous probing, the MS requests a probe response from one of the APs by sending a probe request to the AP, and the MS determines the signal quality value of the AP according to the response signal sent by the AP.

14. The handoff method as claimed in claim 13, wherein an authentication information of the MS is inserted in the probe request.

15. An apparatus using a WLAN handoff method, the WLAN communication system comprising a plurality of APs, the apparatus comprising:

a transceiving module, for transmitting/receiving packages; and a probing module, for probing the APs, wherein the transceiving module and the probing module switch at a predefined interval while the apparatus performs a handoff function, wherein the probing module probes one or more channels each time and selects one of the APs for handoff and re-establishing a network connection according to a predetermined rule;

the apparatus performs a stop-then-resume mechanism while the transceiving module and the probing module switch, and according to the stop-then-resume mechanism, when the signal quality value between the current AP and the apparatus is lower than a minimum acceptable value, the apparatus selects a temporary AP and temporarily switches from the current AP to the temporary AP to continue the probing of the channels;

when the temporary AP does not exist, the probing module stops switching to the transceiving module and continuously probes unprobed channels until an AP having a signal quality value greater than the signal quality value of the AP currently connected to the apparatus is found, and the apparatus selects the AP having a signal quality value greater than the signal quality value of the AP currently connected to the apparatus as the temporary AP for handoff.

16. The apparatus as claimed in claim 15, wherein the probing module selects one or more channels each time to probe the APs discontinuously and records intensities of received signals of the APs, and the transceiving module continues to transmit/receive packages with a current channel.

17. The apparatus as claimed in claim 15, wherein the probing module requests a probe response from one of the APs by sending a probe request to the AP, and the probing module determines a signal quality value of the AP according to the response signal sent by the AP.

18. The apparatus as claimed in claim 17, wherein an authentication information of the MS is embedded in the probe request.

* * * * *